Inventor
MAURY I. HULL

By J. F. Mothershead

Attorney

Nov. 18, 1941.    M. I. HULL    2,262,764
MULTIPLE RADIO TRANSMISSION SYSTEM
Filed July 18, 1938    9 Sheets—Sheet 6

Inventor
MAURY I. HULL
By J. F. Mothershead
Attorney

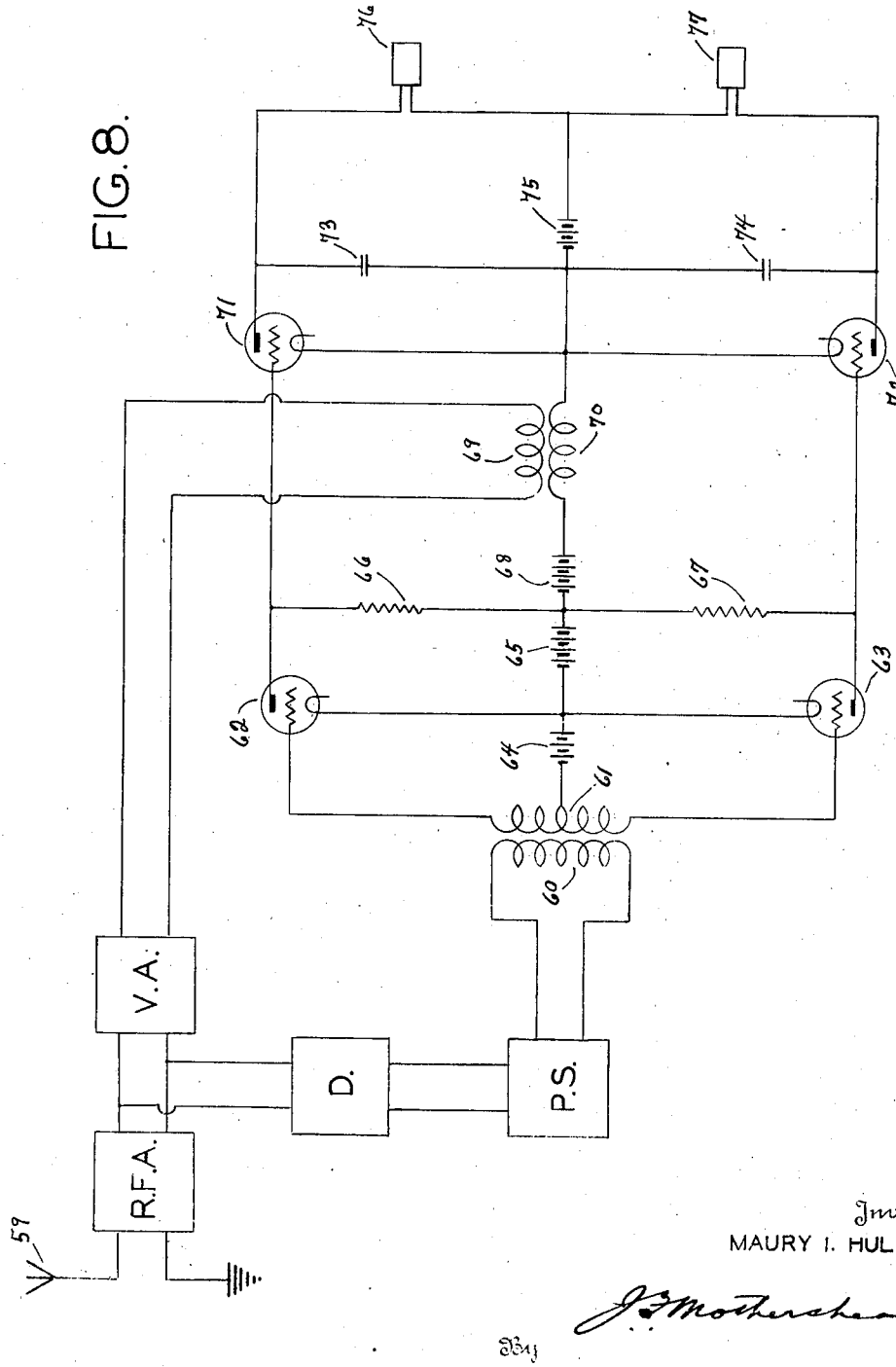

Nov. 18, 1941.  M. I. HULL  2,262,764
MULTIPLE RADIO TRANSMISSION SYSTEM
Filed July 18, 1938  9 Sheets-Sheet 8
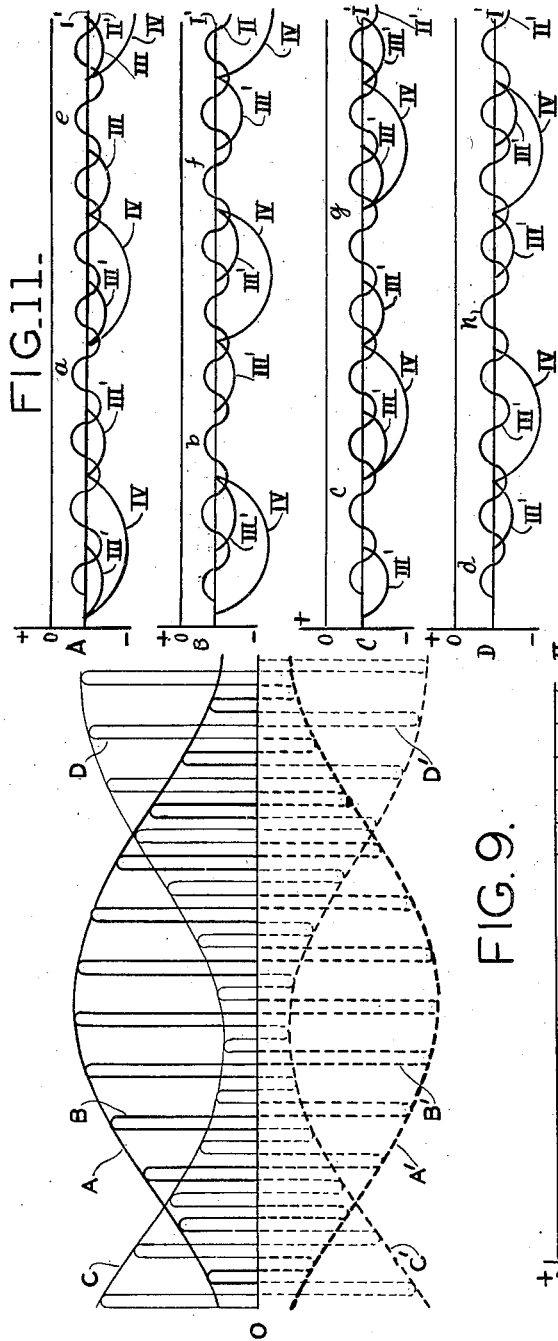
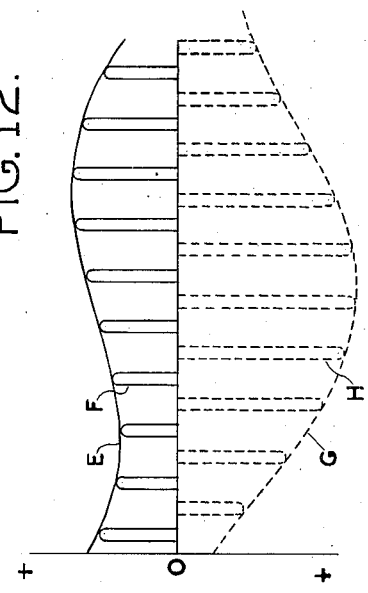
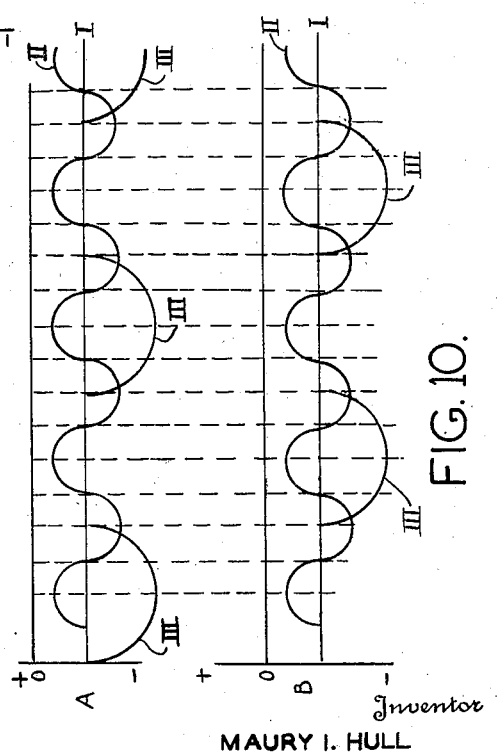
Inventor
MAURY I. HULL
By J. B. Mothershead
Attorney

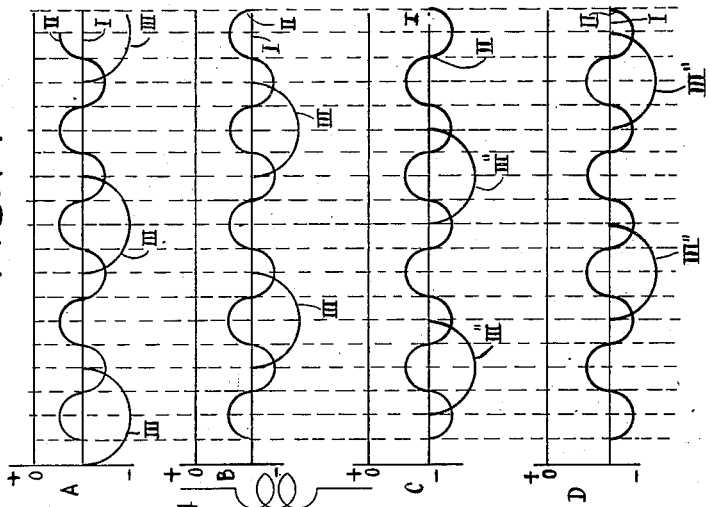
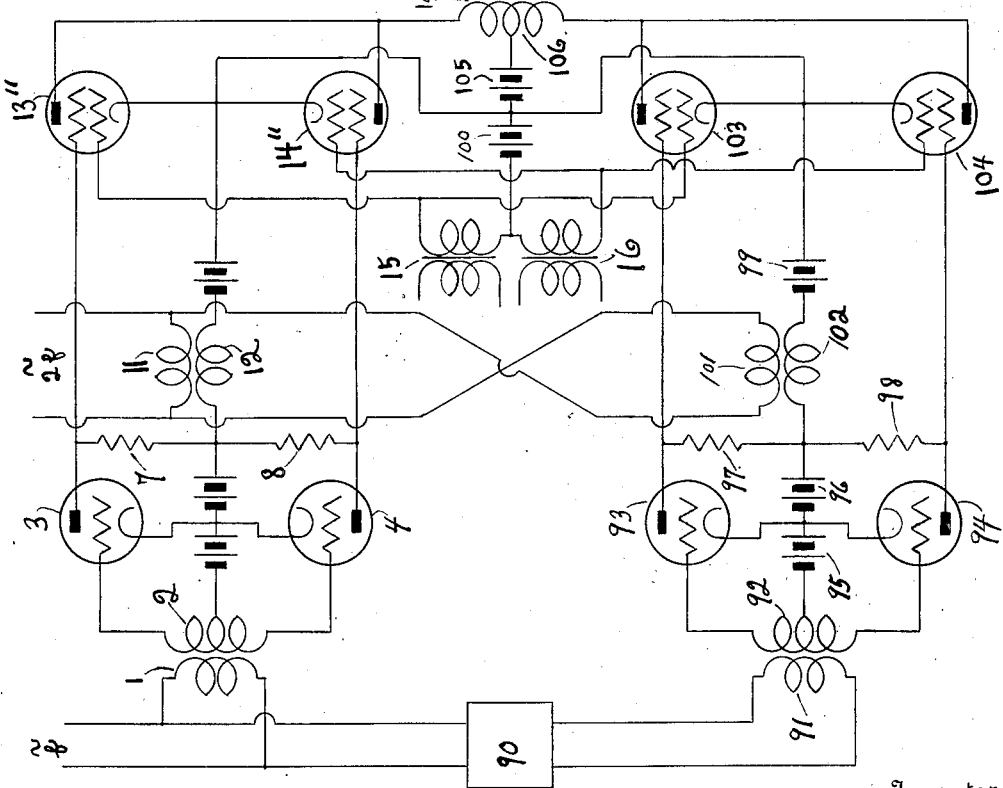

Patented Nov. 18, 1941

2,262,764

UNITED STATES PATENT OFFICE 2,262,764

MULTIPLE RADIO TRANSMISSION SYSTEM

Maury I. Hull, Washington, D. C.

Application July 18, 1938, Serial No. 219,785

16 Claims. (Cl. 250—9)

(Granted under the act of March 3, 1883, as amended April 30, 1928; 370 O. G. 757)

This invention relates to signalling systems and more particularly to systems for transmitting and receiving a plurality of signals simultaneously.

An object of the invention is to provide a system in which a plurality of signals may be transmitted on a single carrier wave.

With this object in view my invention contemplates an arrangement in which alternate cycles or groups of cycles of a carrier frequency are modulated by signals from two separate sources, the rate of alternation being above audibility.

The invention may be adapted to the transmission and reception of more than two messages simultaneously.

Further objects of my invention are to provide in a wave transmission system a novel means whereby a voltage bearing sub-harmonic relationship to a carrier frequency is used to insure that alternate cycles or groups of cycles of the carrier wave are modulated by separate intelligence and in a receiver to provide novel means whereby a voltage bearing a sub-harmonic relationship to the received carrier is used to insure that the carrier modulated at the transmitter in the fashion described above is so broken up in the receiver in synchronism with the incoming signals that the two or more intelligences are properly separated and received.

Other and further objects of the invention will be apparent from the following specification when read in connection with the accompanying drawings in which:

Figure 1 is a circuit diagram of a preferred form of transmitting circuit and arrangement for accomplishing the purposes of the invention.

Figures 2, 3, and 4 are circuit diagrams showing modifications of the transmitting system shown in Figure 1.

Figure 8 is a circuit diagram of a preferred form of receiving apparatus which may be employed.

Figures 9 and 10 are curves illustrating the operation of the transmitting system shown in Figure 1.

Figure 11 is a curve illustrating the operation of the transmitting system shown in Figure 7.

Figure 12 is a curve illustrating the operation of the receiving system shown in Figure 8.

Figure 13 is a circuit diagram illustrating another arrangement for accomplishing the purposes of the invention.

Figure 14 is a curve illustrating the operation of the system shown in Figure 13.

Figure 1:
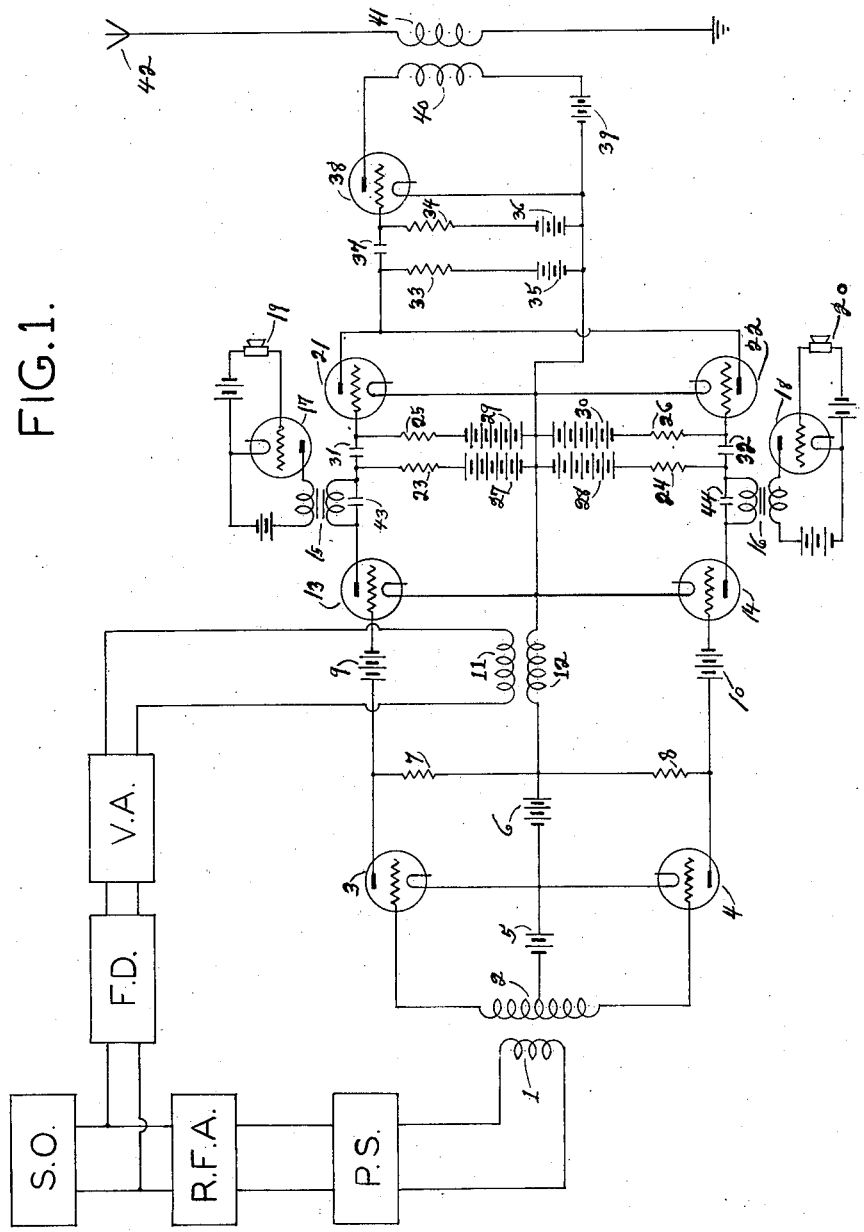

In Figure 1 the rectangle designated S. O. is a source of radio frequency oscillations of any convenient desired frequency. It is preferably a piezo electric crystal control vacuum tube oscillator but it may take any of several known forms. The output from the source of oscillations S. O. is connected to the input circuit of a radio frequency amplifier shown as a rectangle designated R. F. A. The radio frequency amplifier R. F. A. is preferably of the vacuum tube type with a resonant plate circuit load, but it may be any one of many well known amplifier circuits. The output of the radio frequency amplifier R. F. A. is connected to the input circuit of a phase shifter shown as a rectangle designated P. S. The output of the phase shifter P. S. is connected to the primary of the radio frequency transformer 1—2. The secondary 2 of the radio frequency transformer 1—2 is center tapped. The end terminals of the secondary 2 are connected to the control grids of the vacuum tubes 3 and 4 respectively. The center tap connection of the secondary 2 is connected to one terminal of a source of biasing potential 5, the other terminal of which is connected to the cathodes of tubes 3 and 4. A source of anode or plate potential is shown at 6, one terminal being connected to the cathodes of the tubes 3 and 4 while the other terminal is connected to the anodes of tubes 3 and 4 via the resistances 7 and 8 respectively. The anodes of tubes 3 and 4 are connected via sources of biasing potential 9 and 10 respectively to the control electrodes of vacuum tubes 13 and 14 respectively. The mid point between resistances 7 and 8 is connected to the cathodes of tubes 13 and 14 by way of the secondary 12 of a radio frequency transformer 11—12. The primary 11 of the transformer 11—12 is energized indirectly by the source of oscillations S. O. in the following manner, namely:

The source of oscillations S. O. has its output connected to the input circuit of a frequency multiplier or frequency doubler, the rectangle designated F. D. The output of the frequency multiplier or frequency doubler F. D. is connected to the input circuit of a variable attenuator, the rectangle designated V. A. The output of the variable attenuator V. A. is connected to the primary 11 of the transformer 11—12. Microphones or other sources of signals are shown at 19 and 20 connected via amplifiers 17 and 18 respectively to the primaries of audio frequency transformers 15 and 16 respectively. One end of the secondary of the audio frequency transformer 15 is connected to the anode of the tube 13 while the other end is connected to a source of anode potential 27 by way of the resistance 23. One end of the secondary of the audio frequency transformer 16 is likewise connected to the anode of the tube 14 while the other end thereof is connected to a source of anode potential 28 by way of the resistance 24. The low potential sides of the anode batteries 27 and 28 are connected together to the cathodes of the tubes 13 and 14. Radio frequency by-pass condensers 43 and 44 are connected across the secondaries of audio frequency transformers 15 and 16 respectively.

The point in the anode circuit of tube 13 between the secondary of transformer 15 and the resistance 23 is connected to one terminal of a coupling condenser 31, the other terminal of which is connected to the control electrode of tube 21. The point in the anode circuit of tube 14 between the secondary of transformer 16 and the resistance 24 is connected to one terminal of a coupling condenser 32, the other terminal of which is connected to the control electrode of tube 22. Batteries 29 and 30 supply biasing potentials for the control electrodes of tubes 21 and 22 respectively by way of resistances 25 and 26 respectively.

The plates or anodes of the tubes 21 and 22 are connected together to one end of the coupling resistor 33, the other end of which is connected to one terminal of a source of potential or battery 35, the other terminal of which is connected to the cathodes of these tubes.

The anodes of the tubes 21 and 22 are connected to one terminal of a coupling condenser 37, the other terminal of which is connected to the control electrode of the tube 38. Biasing potential is supplied to the control electrode of the tube 38 from the source of potential 36 by way of the resistance 34. The anode of the tube 38 is supplied with potential from the battery or other source of potential 39 by way of primary winding 40 of radio frequency transformer 40—41. The secondary 41 of the radio frequency transformer is connected to an aerial or other radiating system shown at 42.

With tubes 13 and 14 biased to cut-off by their respective grid bias batteries so that no current flows in their respective anode circuits in the absence of excitation from transformers 1—2 and 11—12. The application of oscillations to the transformer 11—12 will cyclically change the potential of the grids or control electrodes of tubes 13 and 14 tending to make the grids less negative with respect to their respective cathodes or filaments (I shall refer to this hereafter as the positive alternation or positive half cycle from inductance 12). Current will flow simultaneously in the plate circuits of both tubes 13 and 14. On the next half cycle of the radio frequency voltage applied to the transformer 11—12, the grids of the tubes 13 and 14 will tend to become more negative, and since these tubes are already normally biased to cut-off any instantaneous increase in negative grid voltage does not influence the anode circuits. If the voltage is continuously introduced via transformer 11—12 there will be a series of pulsations of plate current at the radio frequency in the plate circuits of tubes 13 and 14. These pulsations in this case will occur simultaneously in the output circuits of tubes 13 and 14 during the positive half of a cycle of the voltage introduced in secondary 12.

Assuming now that tubes 3 and 4 are in operation and that the battery 5 supplies sufficient bias for the grids of these tubes so that with no voltage applied to the transformer 1—2 no plate current would flow in the plate circuits of tubes 3 and 4. Then during that part of the cycle of the incoming frequency to transformer 1—2 which induces a positive potential on that terminal of the secondary 2 which is connected to the grid or control electrode of the tube 3, the grid of this tube will be made less negative with respect to its filament and current will flow in its plate circuit. At the same instant the other secondary terminal of inductance 2 will be negative, so that the grid of the tube 4 will be made more negative, and no current will flow in the plate circuit of tube 4 since this tube is normally biased to cut-off by the voltage of battery 5, and hence the instantaneous increase in negative grid voltage does not affect the plate circuit of tube 4. During the next half cycle of the incoming voltage introduced in the secondary 2 the potentials across the two terminals are reversed and plate current flows in the plate of tube 4 but not in that of tube 3. This type of amplifier is familiarly known as a push-pull amplifier.

The currents flowing in the plate circuits of tubes 3 and 4 cause potential differences across their respective load resistances 7 and 8 which in turn cause instantaneous increases in the negative grid potentials of tubes 13 and 14, such instantaneous increases in the negative grid potentials of tubes 13 and 14 being equal to the product of the instantaneous plate currents in amperes multiplied by the respective values of plate resistances 7 and 8 in ohms. The operation above described may be more readily understood by reference to the curve shown in Figure 10 wherein the instantaneous grid voltages on tubes 13 and 14 are shown when both transformers 1—2 and 11—12 are being excited by voltages of the proper frequency, amplitudes and phasal relationship. In Fig. 10 the upper section "A" shows the individual voltages operating in the input circuit of tube 13, and the lower section "B" shows the individual voltages operating in the input section of tube 14. In section "A" curve I is the steady negative component of bias supplied by the battery 9; curve II is the voltage introduced at 12; curve III represents the voltage drop across resistance 7 occurring on alternate alternations of the input voltage to transform 1—2.

In section "B" curve I is the steady negative biasing potential supplied by the battery 10; curve II is the voltage introduced at 12 and is in the same phase as that of curve II of section A; curve II is the voltage drop across resistance 8 occurring on alternate alternations of the input voltage to transformer 1—2, and is opposite in phase to the voltage change across resistance 7. Assuming that the frequency multiplier F. D. doubles the frequency, and assuming that the attenuator V. A. and the radio frequency amplifier R. F. A. are relatively adjusted so that the voltages introduced at the secondary 12 and those developed by the potential differences across resistances 7 and 8 for relative amplitudes as shown in Figure 10, and assuming that the phase shifter P. S. is adjusted so that zero and 180 degrees of the lower incoming frequency from secondary 2 coincides on the time axis with 270 degrees of the higher incoming frequency from the secondary 12, then it will be seen that the positive alternations or positive half cycles of the incoming radio frequency voltage from the secondary 12 produce plate current pulsations in alternate tubes of the two tubes 13 and 14. If the positive alternation of the first cycle of the incoming voltage from the secondary 12 produces a flow of current in tube 13, then it does not produce a flow of current in tube 14. The corresponding alternation of the next cycle of voltage from secondary 12 will then produce a flow of plate current in tube 14, but not in tube 13. During the positive alternations or positive half cycles of the voltage introduced at secondary 12, tube 13 will have a plate current pulsation during, say, half of cycles 1, 3, 5, 7, etc., while tube 14 will have plate current pulsations during the corresponding half of cycles 2, 4, 6, 8, etc. This is brought about by the potential difference developed across resistances 7 and 8 as may be seen by referring to Figure 10. Curve III as mentioned before illustrates the instantaneous voltages developed across resistances 7 and 8 due to plate current flowing in tubes 3 and 4. These voltages are of such polarity as would tend to make the grids in tubes 13 and 14 negative with respect to their filaments. Since tubes 3 and 4 are in a push-pull arrangement, their plates draw current alternately and hence alternate voltage rises shown by curve III affect alternate tubes of the group 13 and 14. Curve II illustrates the voltage introduced at secondary 12 which is twice the frequency of that introduced at secondary 2. Due to the circuit arrangement, voltages induced in secondary 12 act simultaneously and similarly on both tubes 13 and 14, so that by referring to Figure 10 it is seen that while the first positive alternation shown in curve II would activate both tubes 13 and 14, the corresponding negative voltage rise in curve III at the same instant effects only one of the tubes 13 and 14, offsetting the positive voltage of curve II for that particular tube but not for the other which has a plate current pulsation due to its grid potential becoming less negative for an instant. Now proceeding to the second positive alternation of curve II this time the negative voltage rise shown in curve III counteracts the effects of the voltage shown in curve II on a different tube of the group 13—14, so that the tube of the group 13—14 active before is now idle, while the tube idle before is now active. The process thus continues as long the excitation of radio frequency transformer 1—2 and 11—12 continues with the proper frequency and proper phase and magnitude.

These two sets of pulsations in the plate circuits of tubes 13 and 14 are modulated in the plate circuits of their respective tubes by the modulating transformers 15 and 16, which vary the plate voltages of tubes 13 and 14 and hence vary the magnitude of the radio frequency pulsations in their plate circuits in conformance with the frequency and magnitude of the voice or other signals introduced at microphones 19 and 20 respectively, and amplified by tubes 17 and 18 respectively.

The curves shown in Figure 9 depict the manner in which the outputs of tubes 21 and 22 modulated by two different intelligence frequencies and combined in the load impedance 33. In Figure 9 the load currents in load resistance 33 are plotted against time. The pulsations B were supplied by, say, tube 13 and are varied in amplitude in accordance with the modulations envelope A supplied by the audio frequency transformer 15. Pulsations D were supplied by tube 14 and are varied in amplitude in accordance with the modulation envelope C supplied by the audio frequency transformer 16. A', B', C', and D' below the zero point correspond to those above, and represent those portions of the emitted wave supplied by the fly wheel effect of inductance 40, and which were not present in the resistance load at 33.

The functions of tubes 21 and 22 in Figure 1 are to combine both sets of pulsations in one load impedance after they have been separately modulated. These tubes are ordinarily biased by batteries 29 and 30 so that they function as linear amplifiers having a non-inductive load, furnished by the resistance 33. In the plate circuit of tube 38 radio frequency transformer 40—41, connected to the antenna, supplies the other half of the radio frequency cycle.

The description of the operation of the transmitter given above as illustrated by Figures 9 and 10, has been based upon the assumption that the frequency applied to the frequency-exciting transformer 11—12 is twice that applied to the transformer 1—2. Assuming, however, that the frequency multiplier designated F. D. generates a frequency four times that of the source which activates the transformer 1—2, it is obvious that instead of alternate cycles of the carrier being modulated by the two signals, now alternate groups of cycles would be diverted to alternate amplifier tubes and so modulated, each group containing two cycles. Instead of employing a frequency multiplier or frequency doubler F. D. between the sources of oscillations S. O. and the variable attenuator V. A. a sub-harmonic generator may be inserted between the source of oscillations S. O. and the radio frequency amplifier R. F. A. supplying radio frequency to the phase shifter P. S. and thence to the radio frequency transformer 1—2.

In the above descriptions of the operation of the transmitter, the two tubes 13 and 14 have been modulated by transformers 15 and 16 in their respective plate circuits. It is contemplated that the present invention includes a system in which these tubes are modulated in their grid circuits also as shown in Figure 2.

Figure 2:
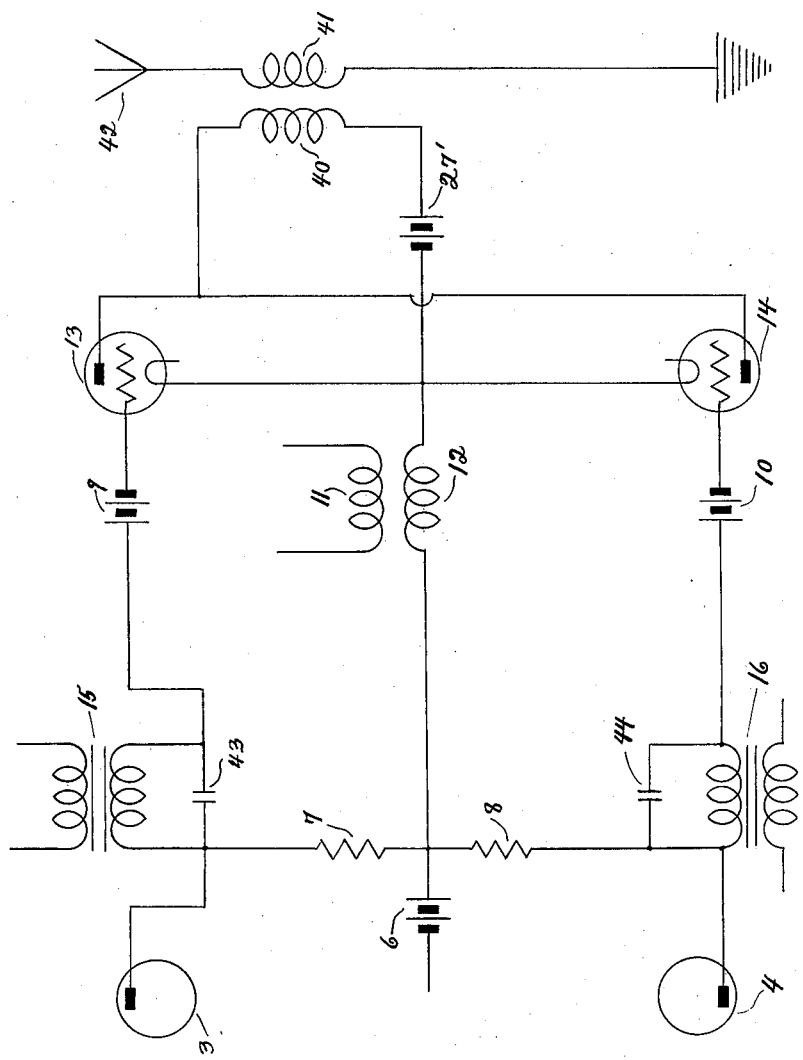

In Figure 2 the same reference characters are used as in Figure 1 to denote like parts and certain of the apparatus has been omitted from the drawings, it being understood, however, that the input circuits of tubes 3 and 4 and the transformer 11—12 are energized in the same manner as in Figure 1. The circuit of Figure 2 differs from that of Figure 1 in that the modulating transformers 15 and 16 and their by-pass condensers have been moved from the plate circuit of tubes 13 and 14 and placed in the grid circuits of the respective tubes. The amplifiers including tubes 21—22 and 38 of Figure 1 have been eliminated from the modification shown in Figure 2 and the plates of tubes 13 and 14 are supplied with potential from a single source 27' via the primary 40 of the radio frequency transformer 40—41, wherein the outputs of tubes 13 and 14 are combined and coupled to the antenna system. The operation of the system shown in Figure 2 is substantially the same as that described in connection with Figure 1, but with the following differences: In Figure 2 the oscillations impressed upon tubes 13 and 14 are modulated in the input circuit to these tubes and the output modulated oscillations from tubes 13 and 14 are combined directly in the primary 40 of the radio frequency transformer.

Where tubes 13 and 14 (Figure 2) are modulated in their grid circuits, the combination of voltages as illustrated in Figure 10 must be modified somewhat by the addition of a fourth voltage which is introduced into the circuit as a result of audio frequency transformers 15 and 16. For convenience in analyzing the action of the circuit, it may be thought of as affecting only the amplitude of the positive portion of the alternations of curve II. The peaks of curve III will now have to develop sufficient negative amplitude to offset the positive alternations of curve II, plus the value of the positive alternations of voltages introduced at transformers 15 and 16. In the case of plate modulation of tubes 13 and 14 as in Figure 1, curve III has to be of sufficient negative amplitude to offset only the positive amplitude of curve II.

Figure 3:
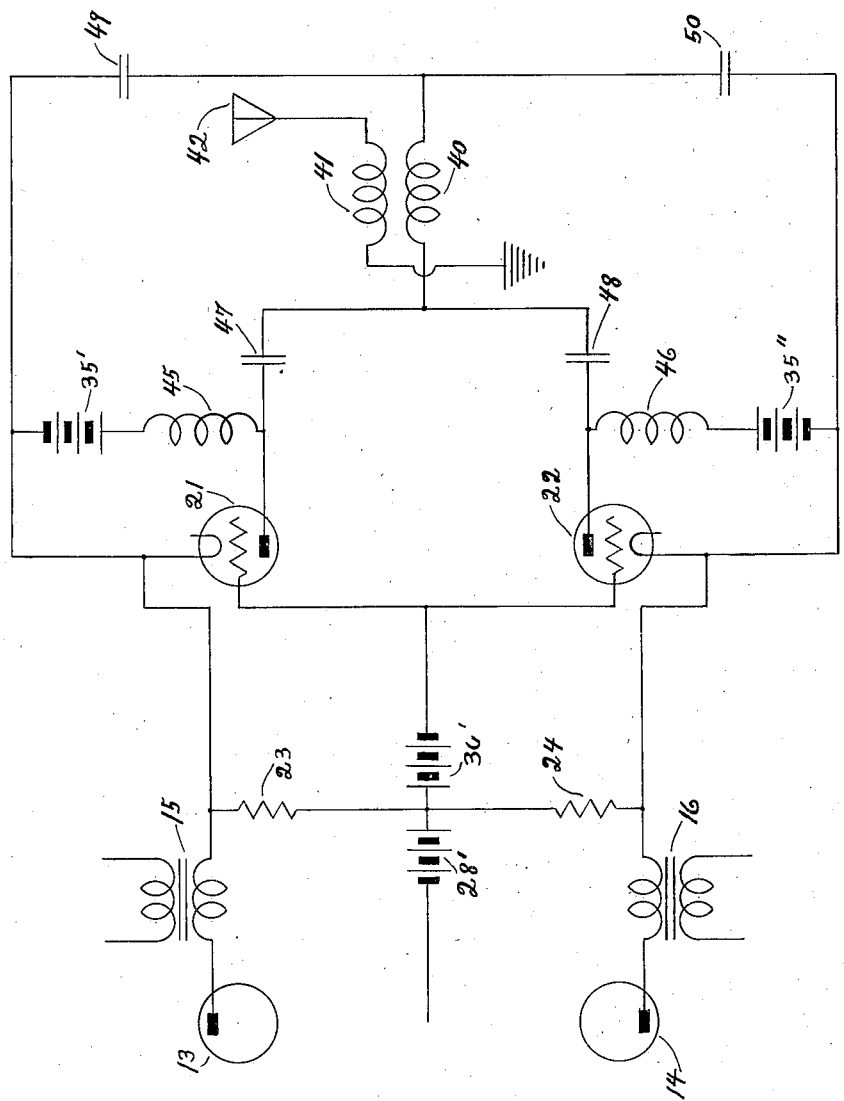

Figure 3 shows another modification of the transmitter circuit of Figure 1. In this modification, the outputs of tubes 13 and 14, which now have a common plate battery 28', are modulated in their plate circuits as in Figure 1, but the outputs of these tubes are directly coupled to the input of tubes 21 and 22 respectively, whose outputs are combined directly in the load inductance 40. Battery 30' supplies the grid bias voltage to both tubes 21 and 22. Batteries 35' and 35'' supply the plate potential for tubes 21 and 22 through radio frequency choke coils 45 and 46 respectively. Coupling condensers 47 and 48 connect the plates of tubes 21 and 22 to inductance 40, allowing the radio frequency currents to pass while offering a practically infinite impedance to direct current. Condensers 49 and 50 complete the respective output circuits of tubes 21 and 22. The condensers 49 and 50 should have a high reactance to the radio frequency used compared to the resistances 23 and 24 in the input circuits of tubes 21 and 22 respectively.

The operation of the system shown in Figure 3 is similar to the operation described above in connection with Figure 1.

Alternate cycles or groups of cycles of the carrier frequency may be diverted into means for separately modulating them by individual intelligences. Part of the circuit for accomplishing this is composed in Figure 1 of radio frequency transformer 1—2, tubes 3 and 4, and resistances 7 and 8. These circuit elements or appropriate combinations of any of them may be coupled to the plate circuits of tubes 13 and 14 instead of to their grid circuits in such manner as to divide the carrier voltage into alternate cycles or groups of cycles which may have been modulated or may be subsequently modulated by separate intelligences. Such a circuit arrangement is shown in Figure 4.

Figure 4:
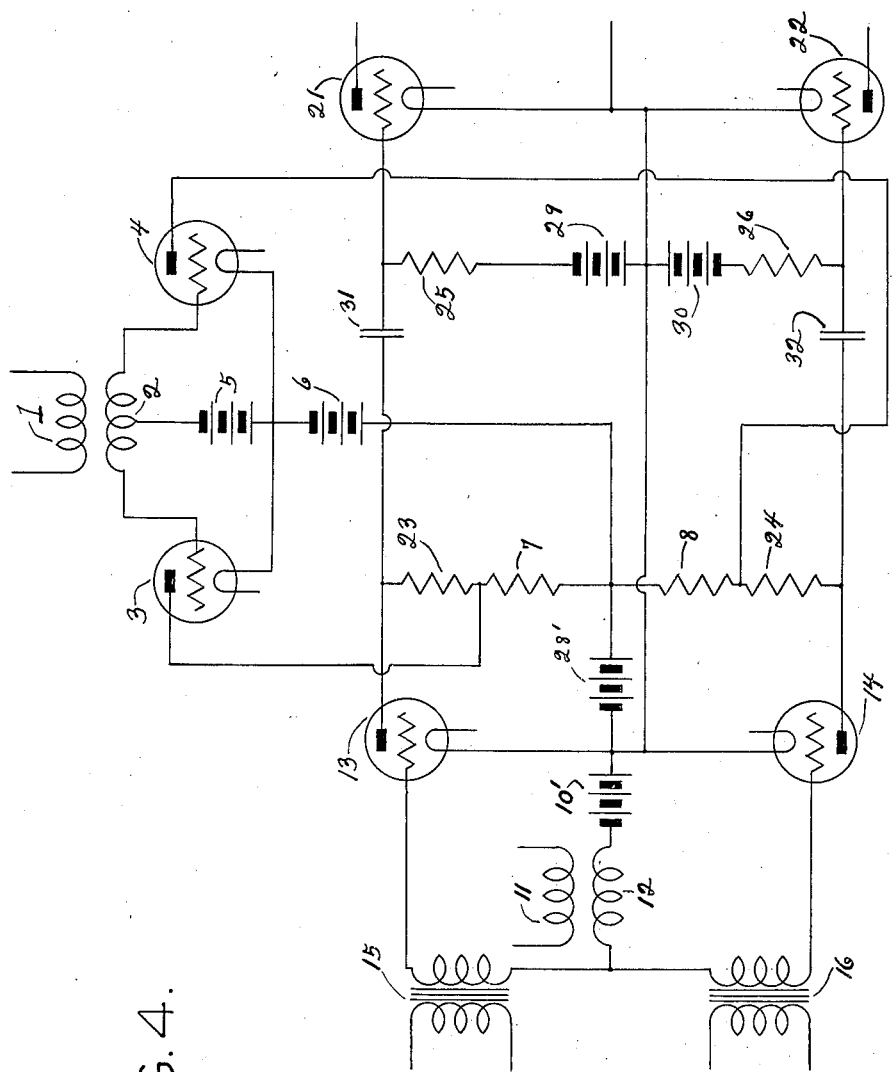

In Figure 4 the secondaries of the modulation transformers 15 and 16 shunted by radio frequency by-pass condensers are connected to the respective control grids of tubes 13 and 14. The other ends of the secondaries are connected together and to the cathodes of tubes 13 and 14 by way of the secondary 12 of the radio frequency transformer 11—12 and the source of biasing potential 10'. The plates of tubes 13 and 14 are supplied with energizing potential from the source 28' by way of coupling resistors 7—23 and 8—24 respectively. The plates of tubes 13 and 14 are connected respectively to coupling condensers 31 and 32 which are in turn connected to the control grids of tubes 21 and 22 respectively as shown and described in connection with Figure 1 and the grids of the tubes 21 and 22 (Figure 4) are biased in the same manner as the respective tubes in Figure 1. In this embodiment the outputs of tubes 3 and 4 are applied to the plate circuits of tubes 13 and 14 respectively. The plate of tube 3 is connected to that point in the plate circuit of tube 13 between the coupling resistors 7 and 23. The plate of tube 4 is connected to that point in the plate circuit of tube 14 between the coupling resistors 8 and 24. Plate potential is supplied to the plates of tubes 3 and 4 from battery 6 connected to the filaments thereof by the connection extending from the battery 6 to the juncture between coupling resistors 7 and 8 and thence through these resistors to the respective tubes 3 and 4.

In this arrangement voltages are alternately developed across resistances 7 and 8 of such polarity that they oppose the positive voltages introduced at battery 28', and hence render tubes 13 and 14, alternately inoperative by reducing their plate voltages to zero or less (negative). As a result tubes 13 and 14 will alternately supply excitation to the amplifier comprising tubes 21 and 22, provided the voltages introduced in the secondary 12 of transformer 11—12 and that existent across resistances 7 and 8 are in the proper phasal and magnitude relations as before, and the operation of the circuit of Figure 4 will, as in Figure 1, provide for the final transmitter carrier being alternately modulated by two intelligences via tubes 13 and 14 which are separately modulated in their grid circuits.

Figure 5:
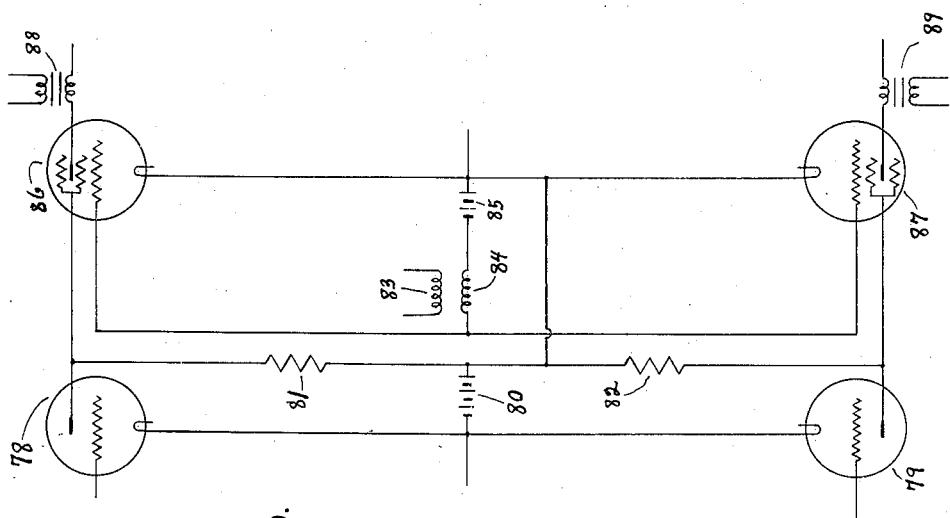
Figure 5 is a diagrammatical showing of a circuit arrangement which may be used as a modification of both the transmitting circuit of Figure 1 and the receiving circuit of Figure 8.

Figure 5 shows a modification of the transmitting circuit of Figure 1 for the use of double grid tubes. Tubes 78 and 79 correspond to tubes 3 and 4 of Figure 1. The plates of tubes 78 and 79 are connected directly to the outermost grids of double grid tubes 86 and 87 respectively. Plate potential is supplied to the plates of tubes 78 and 79 from the source of potential 80 via the coupling resistors 81 and 82. In Figure 5 the tubes 86 and 87 correspond to tubes 13 and 14 in Figure 1. The grids nearest to the cathodes or filaments in tubes 86 and 87 are connected together to the cathodes or filaments of these same tubes via the secondary 84 of the radio frequency transformer 83—84 and a source of grid biasing potential 85. The plates of tubes 86 and 87 are connected respectively to the secondaries of modulation transformers 88 and 89 respectively which correspond to transformers 15 and 16 of Figure 1 respectively. The remainder of the circuit of Figure 5 (not shown) is substantially like that shown in connection with Figure 1. The operation of Figure 5 is substantially similar to the operation of Figure 1 except that instead of the voltages from the secondary 84 to the transformer 83—84 (the transformer corresponding to transformer 11—12 in Figure 1) and the voltages from the resistors 81—82 (coupling resistors corresponding to resistors 7 and 8 in Figure 1) being combined in one circuit they each operate to change the potentials on respective grids of tubes 86 and 87, so that as before negative potentials developed across the resistors operate on alternate tubes of the pair 86—87 to counteract positive potentials from the secondary 84, by means of instantaneous negative grid bias increases on one pair of grids which cuts off all flow of plate current. The modulation transformers 88 and 89 provide a means for individually modulating the outputs of tubes 86 and 87 by separate intelligences in the same manner as transformers 15 and 16 in Figure 1.

Figure 6:
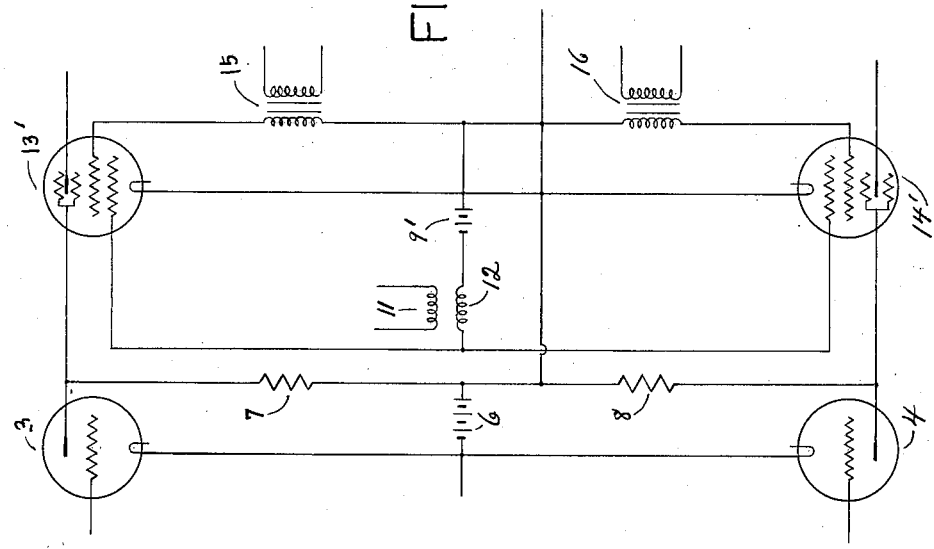
Figure 6 is a circuit diagram showing the transmitter of Figure 1 in another modified form.

Figure 6 shows a modification of the transmitting circuits of Figures 1 and 5 using triple grid tubes. In this circuit triple grid tubes 13' and 14' correspond to tubes 13 and 14 respectively in Figure 1 and 86 and 87 respectively in Figure 5. The connections in Figure 6 are substantially identical with those of Figure 5 with the exception that the modulation transformers 15 and 16 have their secondaries connected between the cathode or filaments and the intermediate grids of the respective tubes 13' and 14'. In this arrangement the varying potentials derived from the modulation transformers 15 and 16 modulate the respective outputs of the tubes 13' and 14' in accordance with the individual intelligences impressed thereon.

In Figures 5 and 6 it is understood that the arrangement of the order of the grids can be changed, for instance in Figure 5 the grid of the tube 86 which is nearest to the filament could be connected to the plate of the tubes 78 and vice versa. Likewise in Figure 6 any desirable arrangement of the grids could be used. It is to be further understood that in Figures 5 and 6 the various grids of the tubes are to be biased to the appropriate desired potentials.

Figure 7:
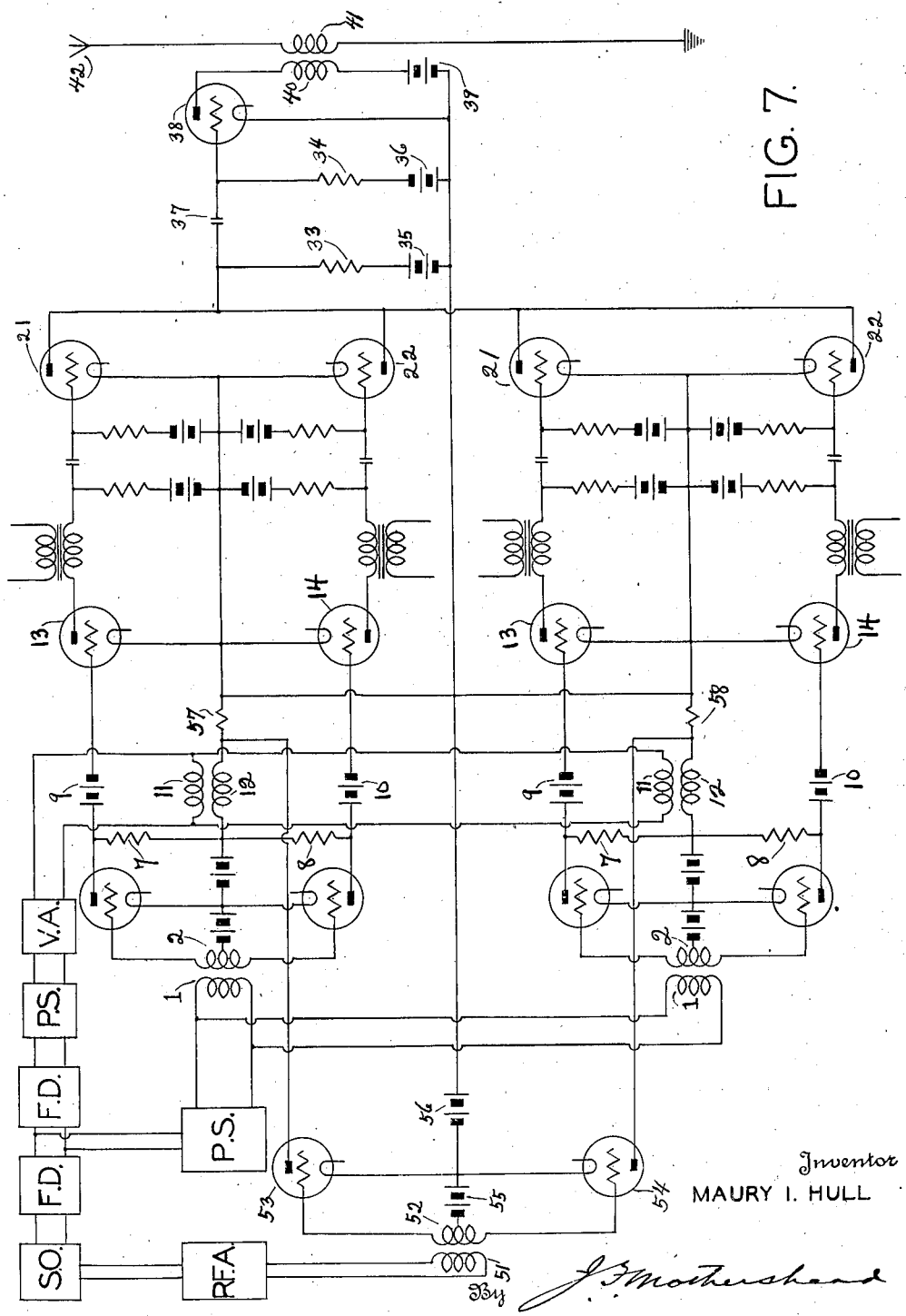
Figure 7 is a circuit diagram showing how the transmitter Figure 1 may be modified for the transmission of four intelligences simultaneously.

Figure 7 shows an adaptation of the transmitting circuit of Figure 1 for the transmission of four intelligences simultaneously. As will be seen it comprises in part two similar circuits, each similar to that portion of the circuit of Figure 1 included between the transformer 1—2 and the pair of tubes 21 and 22 inclusive. In addition, in Figure 7 there is a push-pull amplifier including radio frequency transformer 51—52, amplifier tubes 53 and 54, a source of biasing potential 55 for biasing the grids of said tubes, a source of anode potential 56 and tube load resistances 57 and 58 connected in the respective plate circuits of tubes 53 and 54. The plate load resistance 57 and 58 are connected in series with the secondaries 12 of the transformers 11—12 in the input circuits of tubes 13 and 14 of the respective upper and lower similar portions of the circuit of Figure 7 corresponding generally to Figure 1. With the resistances 57 and 58 each connected in series with one of the secondaries 12 of one of the two duplicate radio frequency transformers 11—12, plate current flow in tubes 53 and 54 via resistances 57 and 58 respectively causes a potential difference to be developed thereacross which serves to increase instantaneously the negative grid potentials of the duplicate input circuits associated with the two transformer secondaries 12. A flow of current in resistance 57 tends to produce a negative potential on the grids of tubes 13 and 14 in the upper portion of the diagram. A flow of current in resistance 58 tends to produce a negative potential on the grids of the tubes 13 and 14 in the lower portion of the diagram. In Figure 7 a second frequency doubler or frequency multiplier F. D. is utilized and a second phase shifter P. S. is employed so that the phasal relationship of the currents in the transformers 51—52, 1—2, and 11—12 can be adjusted with respect to each other.

The operation of the circuit of Figure 7 is best understood by reference to the curve of Figure 11. Assuming first that the radio frequency transformer 51—52 is energized by a voltage of frequency $f$, both radio frequency transformers 1—2 by a frequency $2f$, and both radio frequency transformers 11—12 by a frequency $4f$ which becomes the carrier frequency, all of the proper relative magnitude and phasal relationship with respect to each other, which may be obtained by the frequency doubler F. D. and the phase shifter P. S., together with the amplifier R. F. A. and variable attenuator V. A. In Fig. 11 the individual voltages operating in the control circuits of tubes 13, 14, upper and lower sections, are shown. Section "A" shows the individual voltages active in the input or control circuit of upper tube 13. Section "B" shows the individual voltages active in the input circuit of upper tube 14. Section "C" shows the individual voltages active in the input circuit of lower tube 13. Section "D" shows the individual voltages active in the input circuit of lower tube 14 of Fig. 7. In all sections (A, B, C, and D) I' is the bias supplied by batteries 9 and 10. In all sections the curve II' represents the voltages of frequency $4f$ introduced at transformers 12, and are all in phase in all tubes. In Section A, III' is the voltage drop across the upper resistance 7; in section "B" the curve III' represents the voltage drop across resistance 8; in section "C" the curve III' is the voltage drop across the lower resistance 7; in section "D" the curve III' represents the voltage drop across lower resistance 8. Voltage drops occur simultaneously in both resistances 7 and occur simultaneously in both resistances 8 on the opposite half of cycle of frequency $2f$ from that of resistance 7.

In sections "A" and "B" the curve IV represents the voltage drop across resistance 57 occurring simultaneously in the input circuits of upper tubes 13 and 14. In sections "C" and "D" the curve IV represents the voltage drop across resistance 58, or, in other words, the voltage across resistance 58, which influences the input circuits of lower tubes 13 and 14 in phase. The voltage drops in resistances 57 and 58 occur during alternate alternations of the voltage of frequency $f$.

The operation of the entire circuit of Figure 7 is best explained by describing the action at the four instants when the alternations of curve II' are positive. It is assumed that both transformers 1—2 are excited in phase and both transformers 11—12 are excited in phase. By reference to Figure 11 it is seen that at the instant of the first positive alternation of voltage in curve II', reading from left to right, voltage I' is operative in the grid circuits of all four tubes 13—14, voltage II' is operative in all four grid input circuits, and corresponding tubes of both pairs of tubes 13—14 are blocked by the negative potential shown in curve III'. In addition, tubes 13 and 14 of either the lower or the upper part of the circuit of Figure 7 are further blocked by the negative potential shown in curve IV developed by a potential difference existent across one of the resistances 57 or 58. It will be assumed for purposes of explanation that the first voltage rise of curve III' operates on both tubes 13 and the second voltage rise of curve III' operates on both tubes 14. It will also be assumed for purposes of explanation that the first negative voltage rise of curve IV operates on the upper group of tubes 13 and 14, and the second voltage rise of curve IV operates on the lower group of tubes 13 and 14. Then the first positive alternation shown in curve II' produces a plate current pulsation in the lower tube 14, but in none of the others. On the second positive alternation shown in curve II', as before the voltages shown in curves I' and II' are operative in all four tube input circuits. But now the voltage corresponding to that shown in curve III blocks both tubes 14; the voltage corresponding to that shown in curve IV still blocks the upper tubes 13 and 14; so that on the second positive alternation of curve II' only the lower tube 13 has a plate current pulsation. Now, on the third positive alternation of the voltage corresponding to curve II' both the lower tubes 13 and 14 are blocked by the negative voltage corresponding to curve IV, and the upper tube 13 is blocked by the negative voltage corresponding to curve III', so that only upper tube 14 has a plate current pulsation during the third positive alternation shown in curve II'. On the fourth positive alternation of curve II' both lower tubes 13 and 14 are still blocked by the voltage corresponding to that of curve IV, and the upper tube 14 is blocked by the voltage corresponding to curve III', so that only the upper tube 13 has a plate current pulsation. On the fifth positive alternation of curve II' the entire cycle just described is repeated.

The output of each of the tubes 13 and 14 is separately modulated in its plate circuit, and all four outputs are recombined in the load impedance of resistance 33.

It is contemplated that any of the modifications of the circuit of Figure 1 may also be applied to that of Figure 7. Multi-grid tubes could be used in this arrangement in place of tubes 13 and 14. In a system employing four grid tubes, one of the grids could be excited by the voltage supplied at transformer 11—12, one grid by the voltage supplied from resistances 7 and 8, one by the voltage from modulation transformers, and one by the voltages from resistances 57 and 58. The tubes 53—54, 3—4, etc., could be enclosed in a single envelope having a duplicate set of elements. With this arrangement the two grids could be separately terminated, the two plates could be separately terminated, and the two filaments or cathodes could be terminated together or be a single emitting electrode.

Referring now to Figure 8 a description will be given of one form of receiving circuit for separating the two sets of radio frequency cycles or groups of cycles to derive therefrom the two separate signals or intelligences. In Figure 8 a receiving antenna is shown at 59 connected to a radio frequency amplifier, rectangle R. F. A. The output of the radio frequency amplifier R. F. A. is connected to a frequency divider, rectangle D. The output of the frequency divider is connected to the input circuit of a phase shifter, rectangle P. S. The output of the phase shifter P. S. is connected to the primary 60 of radio frequency transformer 60—61. The secondary of the transformer 60—61 is center tapped. The end terminals of the secondary 61 are connected to the control grids of amplifier tubes 62 and 63 respectively. The center tap of the transformer secondary 61 is connected by means of a source of biasing potential to the cathodes or filaments of the tubes 62 and 63. The plates or anodes of tubes 62 and 63 are connected by respective coupling resistors 66 and 67 to a source of plate potential 65, one terminal of which is connected to the cathodes or filaments of tubes 62 and 63. The plates of tubes 62 and 63 are connected directly to the control grids of tubes 71 and 72 respectively. The cathodes or filaments of tubes 71 and 72 are connected together through the secondary 70 of a radio frequency transformer 69—70 and a source of grid biasing potential 68 to a point between the coupling resistors 66 and 67. The output of the radio frequency amplifier R. F. A. is also connected to the input of a variable attenuator, rectangle V. A. The output of the variable attenuator V. A. is connected to energize the primary 69 of the transformer 69—70. The plates or anodes of tubes 71 and 72 are connected by way of respective indicating devices 76 and 77 which are preferably audible signal indicators, for example: telephone receivers. The other terminal of indicating device 76 and 77 are connected together to the high potential side of a source of plate potential 75, the low potential side of which is connected to the cathodes or filaments of tubes 71 and 72. By-pass condensers 73 and 74 are connected across from cathode or filament to anode or plate of the respective tubes 71 and 72. The tubes 62 and 63 are preferably normally operated as linear amplifiers biased to cut off by the biasing battery 64 so that with no excitation from inductance 61 no current flows in the resistances 66 and 67.

The two tubes 71 and 72 are normally biased to cut off by the grid bias battery 68 in their circuits. The resistances 66 and 67 are so connected that any current flowing in them due to plate currents in tubes 62 and 63 create potential differences which increase the respective negative grid potentials on the two detector tubes 71 and 72.

The operation of the receiver is substantially along the following lines: The incoming wave (bearing two intelligences) is received and amplified by the radio frequency amplifier R. F. A., the output of which excites a frequency divider which in turn excites transformer 60—61. The operation of tubes 62—63, 71—72 is exactly similar to the operation of the parallel group in the transmitter Figure 1, composed of tubes 3—4, 13 and 14. The voltage at the secondary 61 of transformer 60—61 alternately renders tubes 62 and 63 conductive. Current from battery 65 alternately flows in resistances 66 and 67. The alternate variation of current in resistances 66 and 67 gives rise to a voltage change therein effective to change the value of the grid potential on the grids of tubes 71 and 72, thus diverting alternate cycles or groups of cycles of the amplified carrier to the two detector tubes 71 and 72 where they are rectified and delivered to the load circuits 76 and 77. The rate of alternation of the received wave in the receiver is maintained in synchronism with that of the transmitter by using a sub-harmonic of the carrier to excite the transformer 60—61. Any shift in frequency in the source of oscillations in the transmitter will automatically cause a like shift in the harmonic and sub-harmonic frequencies used at the transmitter and receiver, so that the entire system always stays in synchronism. It is not necessary to smooth out the modulated carrier in order to obtain sine wave to excite the transformer 60—61 in the receiver; the output of the frequency divider "should contain no harmonics but" may be non-sinusoidal because as long as the voltages introduced in resistances 66 and 67 have certain minimum value, the extent of their maximum value is unimportant. Operation of the receiver for percentages of modulation approaching one hundred per cent is obtained by adjusting the relative values of voltages at transformer 60—61 and 69—70 so that the voltages at resistances 66 and 67 will always be sufficient to properly counteract the maximum modulated peak voltages introduced by way of transformer 69—70 for any given percentage of modulation. How much further the instantaneous voltages in 66 and 67 rise above this necessary minimum is immaterial. In certain instances where signals are modulated at high percentages, an amplitude discriminating amplifier may be inserted between the frequency divider D and the phase shifter P. S., or the subharmonic frequency may be generated locally by a crystal oscillator which may or may not be influenced by the incoming signals.

The curve shown in Figure 12 illustrates the operation of the receiving circuit of Figure 8. Pulsations of plate current F (plate current plotted against time) occur in the plate circuit of tube 71, conforming to the modulation envelope E. Pulsations of plate current H occur in the plate circuit of tube 72 conforming to the modulation envelope G. Although both of these sets of pulsations are positive, they are drawn in different directions from the zero axis to indicate that they are supplied by different tubes. The current which produces the signal in indicating devices 76 and 77 respectively is the average value of the plate current pulsations occurring at radio frequency in the tubes 71 and 72. As a result of diverting alternate cycles or groups of cycles of the carrier to different detector tubes, the average value of the plate current in each tube is reduced by one-half, but the shape of a modulation envelope remains the same.

It will be apparent that the circuit arrangement of Figures 4 and 5 may also be used as an adaptation of the receiving circuit of Figure 8. In so adapting the circuit of Figure 5 the transformers 88 and 89 would be replaced by signal indicating devices 76 and 77. Transformer 83—84 would then be fed by the carrier frequency corresponding to that applied to transformer 69 in Figure 8, and tubes 78 and 79 would be excited by a sub-harmonic frequency, through the center tapped transformer secondary 61.

The receiving circuit of Figure 8 may be adapted to receive four signals simultaneously transmitted from a transmitter similar to that shown in Figure 7 when the receiving circuit of Figure 8 is modified in accordance with the teachings of Figure 7, the modification of which appears to be obvious. In this case two frequencies would have to be derived from the received carrier, being one-half and one-fourth of the carrier frequency.

Figure 13 shows a further circuit for accomplishing the purposes of the invention. All of the circuits described heretofore have used amplifiers which were activated by and amplified only one-half of the voltage of carrier frequency and which depended upon the flywheel effect of an inductance or tuned circuit to supply a voltage or current of substantially symmetrical or sinusoidal shape. In Figure 13 both halves of the voltage of carrier frequency are each symmetrically modulated. Alternations of each half are diverted to different amplitude tubes (four in all) where they are modulated so that now alternate complete cycles of the voltage of carrier frequency are modulated by individual intelligences and subsequently recombined to form one continuous radio frequency signal. This is accomplished by having a duplicate circuit to divide, amplify and modulate alternate alternations of that half of the cycle of the voltage of carrier frequency which was not affected by the circuit comprising transformer 1 through tubes 13″ and 14″ in the drawings. As was explained in the description of Figure 1, only those half cycles or alternations of the voltage on the secondary of transformer 11—12 which tended to make the grids of the tubes 13 and 14 positive with respect to their filaments were utilized by the circuit; those alternations of opposite polarity were not used and tubes 13 and 14 were both idle during the instants of the unused alternations mentioned above. In the circuit of Figure 13 those alternations unused before are now used to activate a duplicate pair of amplifying tubes 103—104 corresponding to tubes 13″ and 14″, and alternate alternations of this group are diverted to alternate tubes of the group 103—104 by means of a duplicate set of tubes 93 and 94 corresponding to tubes 3 and 4. The operation of this duplicate amplifying circuit comprising transformer 91—92, tubes 93 and 94, and resistances 97 and 98 is exactly similar to its counterpart and is illustrated by the curve in Figure 14, part B. In Figure 13 the primaries 11 and 101 of transformers 11—12 and 101—102 are excited by the same voltage oppositely phased, so that the voltages introduced in secondaries 12 and 102 are oppositely phased. This determines that those alternations of voltage of frequency 2f which produce positive potential on the grids of tubes 13″ and 14″ will produce negative potential on the grids of tubes 103 and 104, while those alternations of voltage at the frequency 2f which produce negative potentials on the grids of tubes 13″ and 14″ will produce positive potentials on the grids of tubes 103 and 104.

The operations of those portions of the circuit of Figure 13 which divert corresponding alternations of alternate cycles of voltage of frequency 2f to alternate amplifying tubes are similar to their operation in Figure 1. The rectangle 90 in Figure 13 is a phase shifting device for advancing or retarding the phase of the voltage of frequency f by 90 degrees as shown by the curve in Figure 14.

In Fig. 14 the curves at "A" and "B" show the voltage applied to the outer grids of tubes 13″ and 14″, respectively, and are identical with Fig. 10. The lower portions "C" and "D" of Fig. 14 depict the combination of voltages in the outer control grid circuits of tubes 103 and 104, respectively. The curve II represents the same voltage in the lower portions "C" and "D" as in the upper portions "A" and "B" except that the alternations are reversed as to the direction of voltage change with respect to time; alternations positive in the upper portions "A" and "B" are negative in the lower portions "C" and "D," and vice-versa, as explained above by the opposite phasing of the potentials applied to transformers 11 and 101. The curve III″ represents the voltage introduced by the potential differences developed across resistances 97 and 98. The phase of curve III″ has been retarded 90° from that of curve III, so that the zero and 180° of the voltage from curve III″ will coincide with 270° of the voltage from curve II.

The four tubes 13″, 14″, 103 and 104 are modulated by transformers 15 and 16 in accordance with the well-known system of grid modulation. Transformer 15 modulates both alternations of one cycle of the voltage of frequency 2f, while transformer 16 modulates both alternations of the succeeding cycles of voltage of frequency 2f. The outputs of the four tubes are combined in the primary 106 of the transformer 106—41. The output of the four tubes is subsequently delivered to a load circuit connected to the secondary 41, as shown in Figure 1. Although double grid tubes are shown in Figure 13 at 13″, 14″, 103, and 104, single grid tubes might be used where the double grid tubes are shown, and the various sets of alternations separately modulated in either the grid or plate circuit of the various tubes, two sets of tube modulating transformers being used. Also, the outputs of tubes 13″, 14″, 103 and 104 as shown and as pointed out hereinbefore may be subsequently amplified and/or subsequently modulated before being combined in one load circuit impedance. Many other possible modifications of the circuit of Figure 13 are apparent, and are contemplated as included within the scope of the appended claims. The adaptations of Figure 13 may be applied to the four channel circuit of Figure 7. While in the explanations of Figures 10, 11 and 14, the various voltages represented by curves III, III′ and III″ are described as coinciding on the time axis with zero and 270 degrees of the voltages corresponding to curves II and II′, it is not necessary that these figures be exact, but only sufficiently close that the various voltages have sufficient amplitude at any and all instants to properly perform their desired functions.

It is understood that while in the drawings batteries have been shown as a source of supply of grid and plate voltages for all tubes, any other suitable source could be used. It is also understood that separate sources of potential may be employed where common sources have been shown and vice versa, provided no undesirable coupling between the circuits is introduced thereby.

Many other modifications of the above circuits are possible, and the drawings referred to are only representative and are not intended to limit the invention thereby, nor are the descriptions to be considered as limitations. For instance, the inductive coupling of transformers 11—12, 1—2, 69—70, etc., could be replaced by resistance coupling. The variable attenuators V. A. and the radio frequency amplifiers R. F. A. can be dispensed with in certain cases where the proper amplitude relationships of the two voltages of different frequencies are inherently attained. The phase shifter P. S. might be eliminated under certain circuit conditions. Diode rectifiers could be used in place of tubes 3 and 4 in Figure 1 and in place of tubes 62 and 63 in Figure 8, etc. The frequencies $f$, $2f$, etc. need not be harmonically related in all cases. It is understood that the embodiments of my invention are not to be restricted by the foregoing specifications or by the accompanying drawings, but only by the scope of the appended claims.

The above described invention may be used by or for the Government of the United States without the payment of any royalty thereon.

I claim:

1. A radio transmission system for modulating corresponding alternations of alternate cycles of a carrier wave of frequency $2f$ with two separate intelligences, comprising a source tof oscillations, means for deriving from said source of oscillations two frequencies, one of frequency $f$ and one of frequency $2f$, a pair of radio frequency translators of the thermionic tube type each having at least a cathode, a control electrode and an anode, means for applying to the control electrodes of said tubes a direct current component of potential of such value that substantially no anode current flows therein in the absence of the application of other components of potential to the control electrodes of said tubes, means for impressing upon the control electrodes of the tubes of said translators two additional components of potential of substantially the same amplitude, one component of frequency $f$ in phase opposition in the two translators, and the other component of frequency $2f$ in phase in the two tubes, whereby anode current may flow in only one of said tubes at any instant, means for separately modulating the oscillations impressed upon the control electrodes of the tubes of the two translators of the said pair, and means for combining and transmitting the separately modulated oscillations.

2. A radio transmission system for modulating alternate groups of cycles of a carrier wave of frequency $nf$, with two separate intelligences wherein $n$ is any integer greater than 1, comprising a source of oscillations, means for deriving from said source of oscillations, oscillations of two frequencies, one of frequency $f$ and one of frequency $nf$, a pair of radio frequency translators of the thermionic tube type each having at least a cathode, a control electrode and an anode, means for applying to the control electrodes of said tubes a direct current component of biasing potential of such value that substantially no anode current flows therein in the absence of the application of other components of potential to the control electrodes of said tubes, means for impressing upon the control electrodes of the tubes of said translators two additional components of potential of substantially the same amplitude, one component of frequency $f$ in phase opposition in the two translators, and the other component of frequency $nf$ in phase in the two translators, whereby anode current may flow in only one of said tubes at any instant, means for separately modulating the oscillations impressed upon the control electrodes of the tubes of the two translators of said pair, and means for combining and transmitting the separately modulated oscillations.

3. A transmission system in accordance with claim 1 in which the oscillations of frequency $2f$ applied to said pair of translators are separately modulated in the grid circuits of said translators.

4. A transmission system in accordance with claim 1 in which the oscillations of frequency $2f$ are derived from the source of oscillations of frequency $f$ by means of a frequency doubler.

5. A radio transmission system for modulating corresponding alternations of alternate cycles of a carrier wave of frequency $2f$ with two separate intelligencies, comprising a source of oscillations, means for deriving from said source of oscillations two frequencies, one of frequency $f$ and one of frequency $2f$, a pair of radio frequency translators of the thermionic tube type each having at least a cathode, two grid electrodes and an anode, means for applying a potential of the frequency $2f$ to one of the grids of each of said tubes in phase and means for applying a potential of the frequency $f$ in phase opposition to the other of the grids of the respective tubes, the polarity and amplitude of the potentials of frequency $f$ being of such value as to always render one or the other of said tubes inoperative to pass anode current.

6. A system as set forth in claim 1 in which the tubes of said translators have at least three grids, means for applying a potential of the frequency $2f$ to one of the grids of each of said tubes in phase, means for applying a potential of the frequency $f$ to another one of the grids of said tubes in phase opposition and means for applying to the remaining grid of each of said tubes a modulating potential.

7. A wave translating system comprising at least one pair of thermionic tubes each having at least one control grid, an anode and a cathode, means for biasing the control grids of said tubes to the point that no anode current flows, and means for decreasing the instantaneous potential applied to said tubes in alternate order, said last-mentioned means comprising a first source of alternating current potential, a second source of alternating current potential having a frequency harmonically related to the frequency of said first source of potential, means for applying components of potential from said first source to the control grids of said tubes in phase opposition in the two tubes, and means for applying components of potential from said second source to the control grids of said tubes in phase in the two tubes said components of potential applied from said second source being at least no greater in amplitude than the components applied from said first source.

8. A wave translating system in accordance with claim 7 in which said tubes each include a second control grid and means for applying to each of said second control grids an individual signal potential for modulating the waves translated by each of said tubes with the signals individual thereto.

9. A wave transmission system comprising a source of alternating current potential, a pair of thermionic tubes each having at least a cathode, a control grid and an anode, means for applying to the control grids of said tubes a direct current component of biasing potential of such value that substantially no anode current flows therein in the absence of the application of other components of potential to the control grids of said tubes, means for applying components of potential from said source of alternating current potential to the control grids of said tubes in phase, means for applying components of potential sub-harmonically related to the alternating current potential derived from said source to the control grids of said tubes in phase opposition, means for adjusting the magnitude of the potentials applied to the control grids of said tubes so that said applied components of potential of the lower frequency are at least as great in amplitude as the components of potential of the higher frequency, and means for adjusting the phasal relationship between said applied potentials.

10. A wave transmission system in accordance with claim 9 including means for modulating the waves translated by each of said tubes in accordance with separate individual signals.

11. A radio transmission system for modulating alternate groups of cycles of a carrier wave of frequency $2nf$, with two separate intelligences wherein $n$ is any integer, comprising a source of oscillations, means for deriving from said source of oscillations, oscillations of two frequencies, one of frequency $f$ and one of frequency $2nf$, a pair of radio frequency translators of the thermionic tube type each having at least a cathode, a control electrode and an anode, means for applying to the control electrodes of said tubes a component of biasing potential of such value that substantially no anode current flows in said tubes in the absence of the application of other components of potentials thereto, means for impressing upon the control electrodes of the tubes of said translators potentials of frequency $f$ in phase opposition, means for impressing upon the control electrodes of the tubes of said translators other potentials of frequency $2nf$, means for adjusting the phase and amplitude of the potentials of said two frequencies impressed upon the control electrodes of said tubes so that only one of said tubes may pass anode current at any instant, means for separately modulating the oscillations translated by the two tubes of said pair, and means for combining and transmitting the separately modulated oscillations.

12. A radio transmission system for modulating a carrier wave of frequency $2f$ with two intelligences, comprising a source of oscillations, means for deriving from said oscillations two potentials, one of frequency $f$ and one of frequency $2f$, means for rectifying the potential of frequency $f$, a pair of radio frequency translators of the thermionic tube type, each having at least a cathode, a control grid and an anode, means for applying to the control grids of said tubes a steady direct current component of biasing potential, of such value that substantially no anode current flows therein in the absence of the application of other components of potential to the control grids of said tubes, means for impressing upon the control grids of the tubes of said translators a potential of frequency $2f$ in phase in the two tubes, means for impressing a rectified component of potential of frequency $f$ upon the control grid of one of said tubes, means for impressing another rectified component of potential of frequency $f$ upon the control grid of the other of said translator tubes alternately, the said rectified components of potential being at least as great in amplitude as the components of potential of frequency $2f$ and of the same polarity as the direct current component of biasing potential means for separately modulating the oscillations delivered to the two translators of the said pair and means for combining and transmitting the separately modulated oscillations.

13. A system in accordance with claim 12, in which the rectified portions of the potential of frequency $f$ are impressed upon the individual translator tubes by way of non-inductive resistances in the grid circuits of said amplifiers.

14. A system in accordance with claim 2 in which the component of potential of frequency $f$ impressed upon the control electrodes of said amplifiers is pulsating and uni-directional in character and of the same polarity as the direct current component of potential applied thereto.

15. A wave translating system for dividing an alternating potential of frequency $f$ into groups of cycles including at least one cycle per group comprising in combination at least one pair of thermionic tubes each having at least a cathode, a control grid and an anode, means for applying a direct current component of biasing potential to the control grids of said tubes, means for exciting the control grids of said tubes in phase by said alternating potential of frequency $f$, means for securing a second alternating potential sub-harmonically related to said first-mentioned potential, means for separately rectifying both half-waves of said sub-harmonic potential, means for applying the rectified half-wave components of potential to the respective grids of said tubes so as to aid the direct current component of biasing potential applied thereto, whereby the tubes of said pair are rendered inoperative in alternate order effecting a translation of the potential of frequency $f$ first by one of said tubes and then by the other.

16. A system in accordance with claim 15 including means for separately modulating with different signal intelligencies the potentials of frequency $f$ translated by said tubes.

MAURY I. HULL.